(No Model.)

C. C. MALLETT.
SELF CLOSING BOX OR BIN.

No. 535,708. Patented Mar. 12, 1895.

Witnesses:
G. W. Rea.
Thos. A. Green.

Inventor:
Charles C. Mallett,
By James L. Norris.
Atty.

UNITED STATES PATENT OFFICE.

CHARLES CHIDLEY MALLETT, OF LONDON, ENGLAND.

SELF-CLOSING BOX OR BIN.

SPECIFICATION forming part of Letters Patent No. 535,708, dated March 12, 1895.

Application filed April 24, 1894. Serial No. 508,840. (No model.)

*To all whom it may concern:*

Be it known that I, CHARLES CHIDLEY MALLETT, of London, England, have invented an Improved Self-Closing Box or Bin, of which the following is a specification, reference being had to the accompanying drawings, in which—

Figure 1:
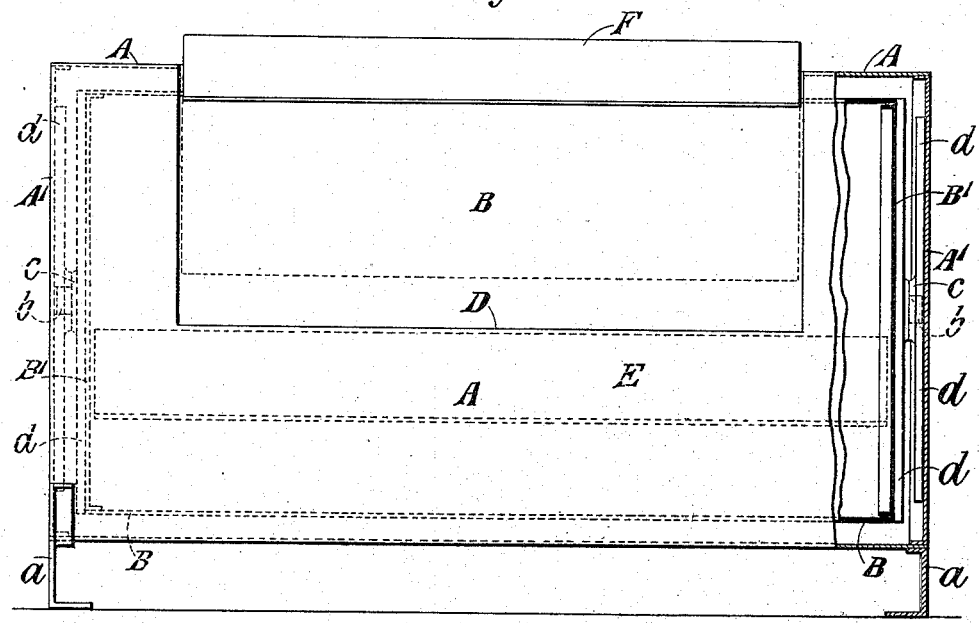
Figure 2:
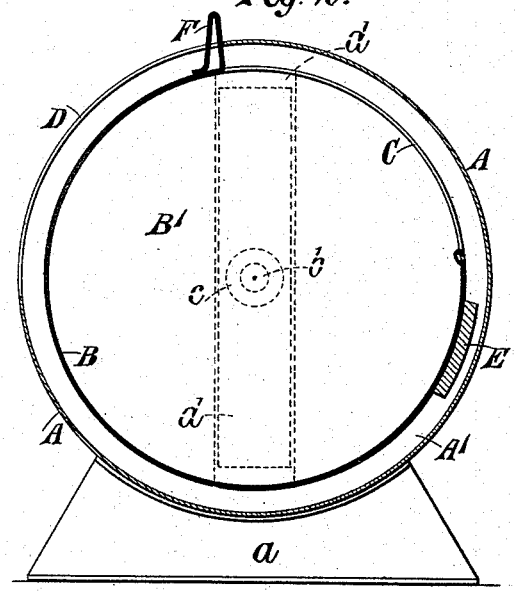
Figure 3:
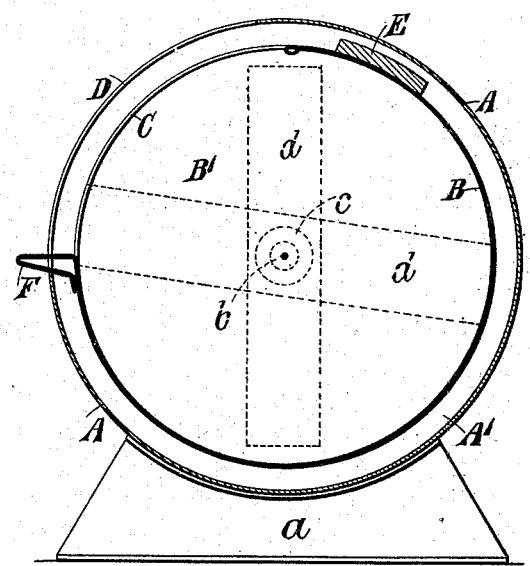

Figure 1 is a front elevation, partly in vertical longitudinal central section, of my improved self-closing box or bin. Fig. 2 is a transverse section of the same showing it closed. Fig. 3 is a transverse section showing the said box or bin open.

The object of my invention is to provide a box or bin which can be easily opened, but which cannot be accidentally left open.

To this end my invention consists in the novel combination, arrangement and operation of parts hereinafter described and pointed out in the claim.

In making my improved box or bin, I combine with an outer casing, having a suitable opening, a receptacle mounted upon trunnions within the said casing so that it can be freely turned about its longitudinal axis, and provided with an opening which, by the turning of the said receptacle about its axis in one or the other direction, can be made to register with the opening in the casing, or can be brought into such a position that it will be covered or closed by the outer casing. The said receptacle is provided with a weight or its equivalent to hold the said receptacle in the last named position and thus permit access to its interior, and to return it automatically to that position after the box or bin has been opened.

Referring to the drawings, A is the outer casing. B is the inner receptacle. The said casing and receptacle are preferably made of cylindrical form as shown and arranged concentrically with their common axis horizontal, the casing A being provided with suitable feet $a$ for supporting it. The inner receptacle B is provided on each of its heads or ends B' with pivots or trunnions $b$ which work in bearings $c$ secured to the heads or ends A' of the casing A. I find it advantageous, moreover, in some cases, to provide cross-bars or stiffening-pieces $d$ to strengthen the said heads or ends of the casing A and receptacle B. In the cylindrical walls of the casing A and receptacle B, are formed segmental openings C and D respectively, adapted to register with each other when the receptacle B is turned into the position shown in Fig. 3.

For the purpose of keeping the box or bin closed as indicated in Fig. 2, a suitable weight E is secured to the receptacle B on the side of the axis opposite the opening D in the casing A, so that the said weight tends to keep the receptacle B in such a position that its opening C is covered by the cylindrical wall of the casing A.

To afford a ready means of turning the receptacle B about its axis to open the box or bin, and, at the same time, to limit the movement of the said casing in both directions, I provide the said receptacle with a projecting rib or finger-piece F at one edge of the aperture C, which rib or finger-piece extends through the aperture D in the casing A, so that it may be easily taken hold of by the fingers to turn the receptacle B about its axis and thus open the box or bin. The weight E is raised in the operation of opening the box or bin, and, when the said rib or finger-piece is released, the receptacle B is automatically turned by the said weight E until the said rib or projection bears against the edge of the casing A at the top of the aperture D.

If desired, other equivalent devices may be employed to automatically close the box, such for example, as a coiled or other spring.

My improved box or bin is specially advantageous for containing bread, biscuits and other provisions. It is however, also useful for other purposes.

When my improved box or bin is designed to contain bread and similar substances, I preferably construct it as shown so as to provide an air-space between the casing A and receptacle B, so that, when the box or bin is closed, there will be a communication open between the interior of the said receptacle and the external atmosphere, and any moisture or vapor emanating from the bread can, therefore, freely escape. It is obvious, however, that I can, if desired, so construct the said box or bin that it will be almost or completely air-tight when closed.

What I claim is—

The herein described self-closing box or bin, consisting of an outer casing having an opening in the upper part thereof an inner receptacle mounted on trunnions in said casing and having an opening in its upper part adapted to register with the opening in the casing a finger piece carried by said receptacle at one side of the opening therein and projecting through the opening in the casing to be grasped by the operator to rotate the receptacle to bring the openings in said receptacle and casing into register and to limit the movement of said receptacle, and a weight carried by said receptacle at the side of the opening therein opposite that at which the finger piece is located, whereby the openings in said receptacle and said casing are held normally out of register to close access to said receptacle, and also automatically returned to such nonregistering position when the finger piece is released by the operator after the said openings have been brought to register to afford access to said receptacle, substantially as described.

CHARLES CHIDLEY MALLETT.

Witnesses:
EDWIN ALTOAD,
LAWRENCE N. BAMLEN.